(12) United States Patent
Gotou et al.

(10) Patent No.: US 8,671,775 B2
(45) Date of Patent: Mar. 18, 2014

(54) FLOW RATE MEASURING DEVICE (75) Inventors: Hirokazu Gotou, Nara (JP); Aoi Watanabe, Nara (JP); Yuji Fujii, Nara (JP); Kouichi Takemura, Nara (JP); Yuji Nakabayashi, Nara (JP)

(73) Assignee: Panasonic Corporation, Osaka (JP)

( * ) Notice: Subject to any disclaimer, the term of this patent is extended or adjusted under 35 U.S.C. 154(b) by 116 days.

(21) Appl. No.: 13/516,588

(22) PCT Filed: Dec. 14, 2010

(86) PCT No.: PCT/JP2010/007260
§ 371 (c)(1),
(2), (4) Date: Jun. 15, 2012

(87) PCT Pub. No.: WO2011/074248
PCT Pub. Date: Jun. 23, 2011

(65) Prior Publication Data
US 2012/0255368 A1 Oct. 11, 2012

(30) Foreign Application Priority Data
Dec. 16, 2009 (JP) .................................. 2009-284700

(51) Int. Cl.
*G01F 1/66* (2006.01)
(52) U.S. Cl.
USPC ........................................................ 73/861.27
(58) Field of Classification Search
USPC .............................. 73/861.27, 861.28; 702/51
See application file for complete search history.

(56) References Cited

U.S. PATENT DOCUMENTS

| 4,509,372 | A | * | 4/1985 | Mount ........................ 73/861.28 |
| 6,625,549 | B1 | * | 9/2003 | Nawa et al. ..................... 702/51 |
| 6,772,643 | B2 | | 8/2004 | Eguchi et al. |
| 7,027,936 | B2 | * | 4/2006 | Ploug-Soerensen et al. ... 702/48 |
| 8,489,342 | B2 | * | 7/2013 | Dugger et al. .................. 702/48 |

FOREIGN PATENT DOCUMENTS

| JP | 2003-106882 A | 4/2003 |
| JP | 2004-125769 A | 4/2004 |

OTHER PUBLICATIONS

International Search Report for International Application No. PCT/JP2010/007260, dated Jan. 25, 2011, 1 page.

* cited by examiner

*Primary Examiner* — Jewel V Thompson
(74) *Attorney, Agent, or Firm* — Brinks Gilson & Lione (57) ABSTRACT

When a flow rate is equal to or more than a reference flow rate, a reference voltage is changed to a level capable of measuring stably to thereby realize the improvement of measurement accuracy at the time of a large amount of flow rate. A flow rate determination means compares a flow rate calculated by a flow rate calculation means with the reference flow rate. When the calculated flow rate is larger than the reference flow rate, the reference voltage set by a reference voltage setting means is changed, whereby the zero cross point can be detected stably at the portion where the degree of the influence of the change in the amplitude of the received signal is small. Thus, it is possible to provide a flow rate measuring device capable of measuring a flow rate stably with high accuracy even when a fluid flow is disturbed due to a large amount of flow rate.

4 Claims, 9 Drawing Sheets

FLOW RATE MEASURING DEVICE

This application is a 371 application of PCT/JP2010/007260 having an international filing date of Dec. 14, 2010, which claims priority to JP2009-284700 filed Dec. 16, 2009, the entire contents of which are incorporated herein by reference.

TECHNICAL FIELD

The present invention relates to a flow rate measuring device for measuring flow of fluid such as water by utilizing ultrasonic.

BACKGROUND ART

Figure 7:
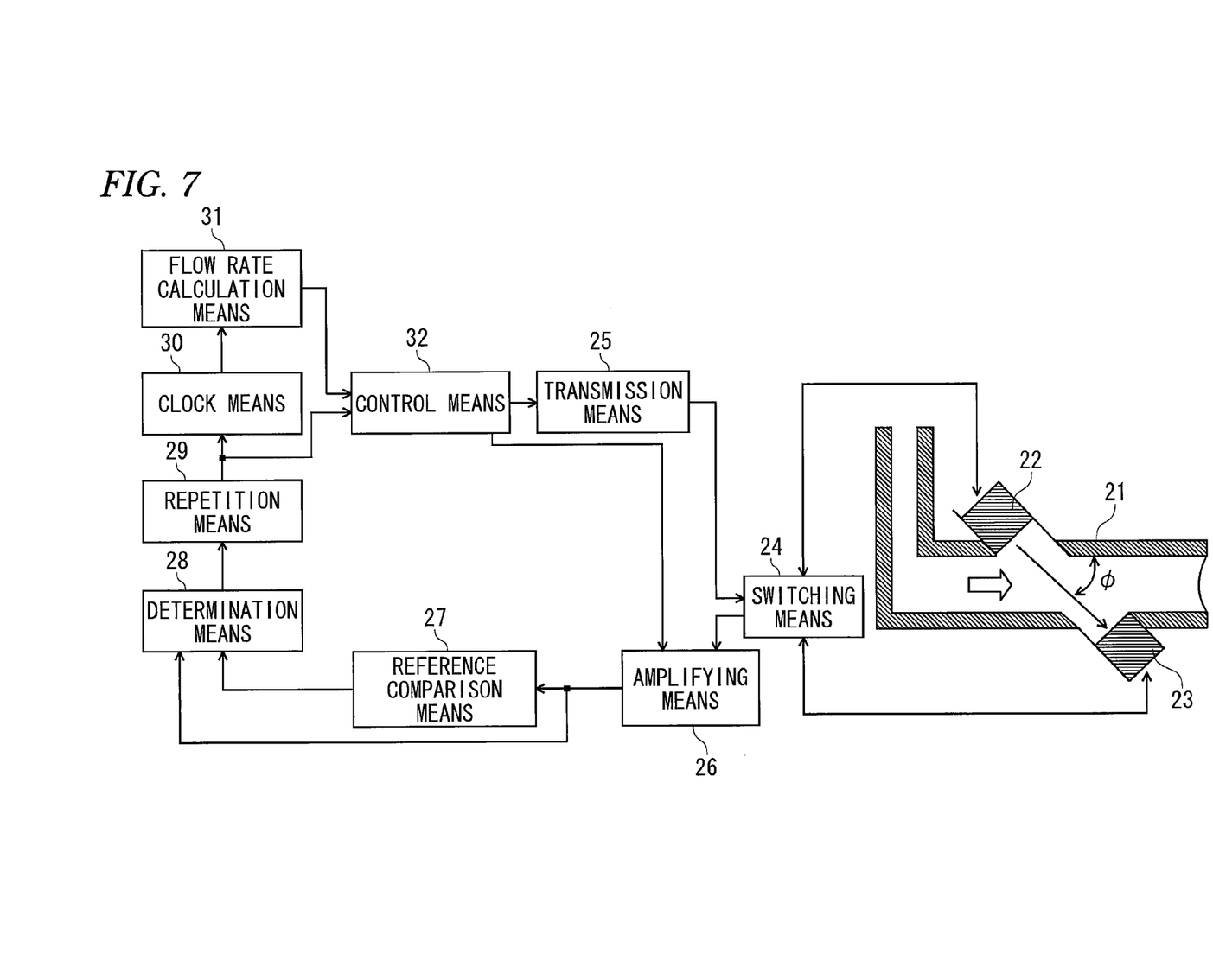
FIG. 7 is a diagram showing the configuration of a flow rate measuring device of a related art.
Figure 8:
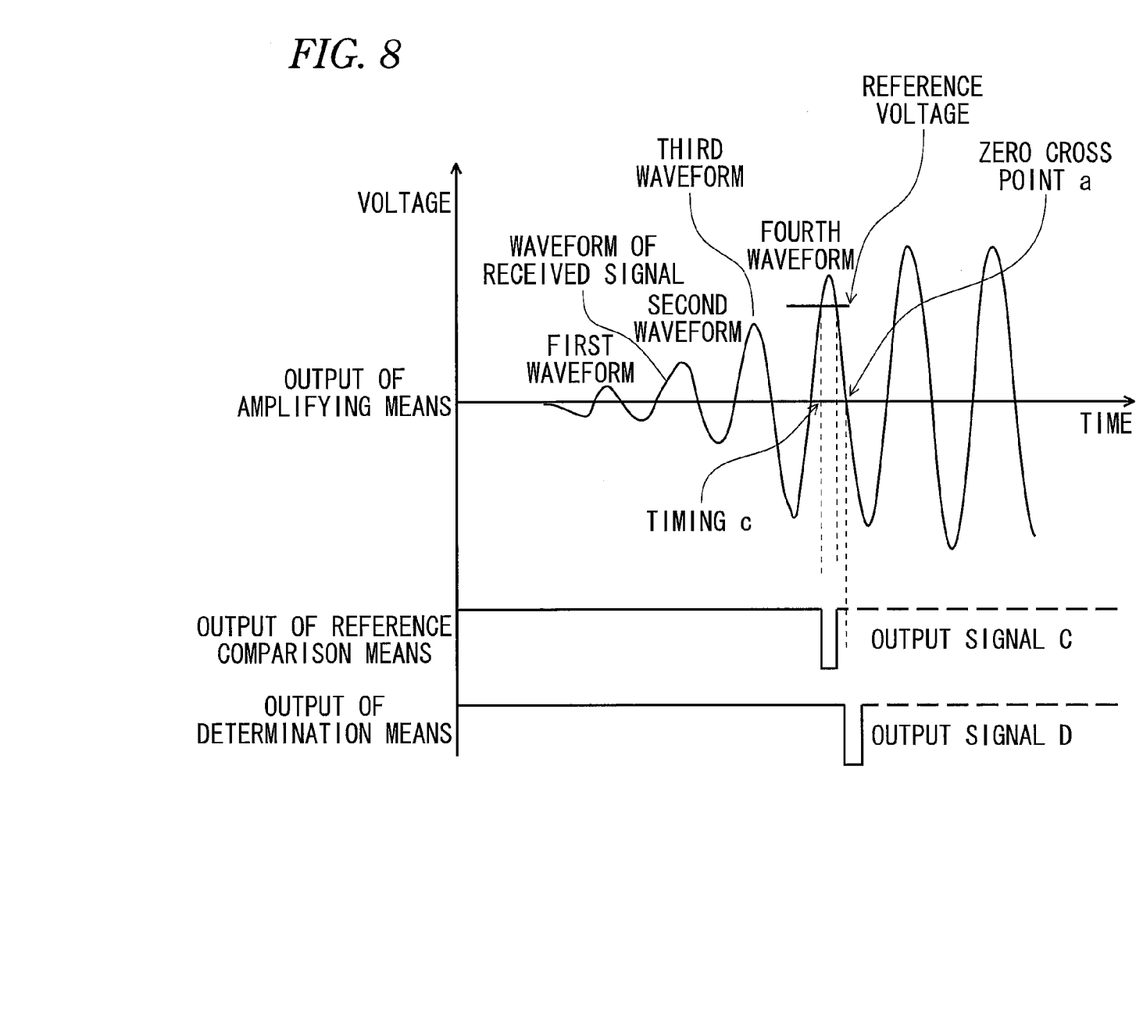
FIG. 8 is a diagram for explaining the operation of the flow rate measuring device of the related art.

A device shown in FIG. 7 is known generally as such the kind of flow rate measuring device for fluid of the related art (see a patent literature 1, for example). This device is configured by a first ultrasonic transducer 22 and a second ultrasonic transducer 23 disposed in a flow path 21 flowing fluid therethrough; a switching means 24 which switches transmission/reception between the first ultrasonic transducer 22 and the second ultrasonic transducer 23; a transmission means 25 which drives the first ultrasonic transducer 22 and the second ultrasonic transducer 23; an amplifying means 26 which amplifies, with a predetermined amplitude, a received signal received by the ultrasonic transducer on a reception side and passed through the switching means 24; a reference comparison means 27 which compares the voltage of the received signal amplified by the amplifying means 26 with a reference voltage; a determination means 28 which detects from an output signal C that the magnitude relation between the voltage of the received signal and the reference voltage is reversed as a result of the comparison therebetween by the reference comparison means 27 as shown in FIG. 8 and outputs an output signal D to a repetition means 29 at a timing of a first zero cross point a of the amplified signal generated thereafter; the repetition means 29 which counts the output signal D from the determination means 28 and outputs the signal from the determination means 28 to a control means 32 when the count number reaches a preset number; a clock means 30 which measures a time required for the repetition means 29 to count the preset number; a flow rate calculation means 31 which calculates a flow rate in accordance with the time measured by the clock means 30; and the control means 32 which receives an output representing the calculated flow rate from the flow rate calculation means 31 and the signal from the repetition means 29 to thereby control the operation of the transmission means 25.

According to this device, when the control means 32 operates the transmission means 25, an ultrasonic signal generated from the first ultrasonic transducer 22 propagates within the flowing fluid and is received by the second ultrasonic transducer 23. Then, the received signal is amplified by the amplifying means 26, then subjected to the signal processings by the reference comparison means 27 and the determination means 28, and inputted into the clock means 30 and the control means 32 via the repetition means 29. Then, the switching means 24 performs the switching between the first ultrasonic transducer 22 and the second ultrasonic transducer 23, and an operation similar to the aforesaid operation is performed. This operation is repeatedly performed for a preset number of times n, whereby the clock means 30 measures a propagation time of the fluid to be measured to the downstream from the upstream (flow in this direction is called a forward flow) and a propagation time thereof to the upstream from the downstream (flow in this direction is called a reverse flow). Then, the flow speed of the fluid to be measured is obtained and a flow rate Q is obtained by the following (expression 1).

Supposing that an effective distance between the ultrasonic transducers in the flowing direction is L, a measured time of n-times to the downstream from the upstream is t1, a measured time of n-times to the upstream from the downstream is t2, the flow speed of the measured fluid is v, the sectional area of the flow path is S, a sensor angle is $\phi$ and the flow rate is Q, the following expression is obtained.

$$Q = S \cdot v = S \cdot L/2 \cdot \cos\phi((n/t1)-(n/t2))$$ (expression 1)

In fact, the flow rate is obtained by further multiplying the expression 1 by a coefficient according to the flow rate.

Figure 9:
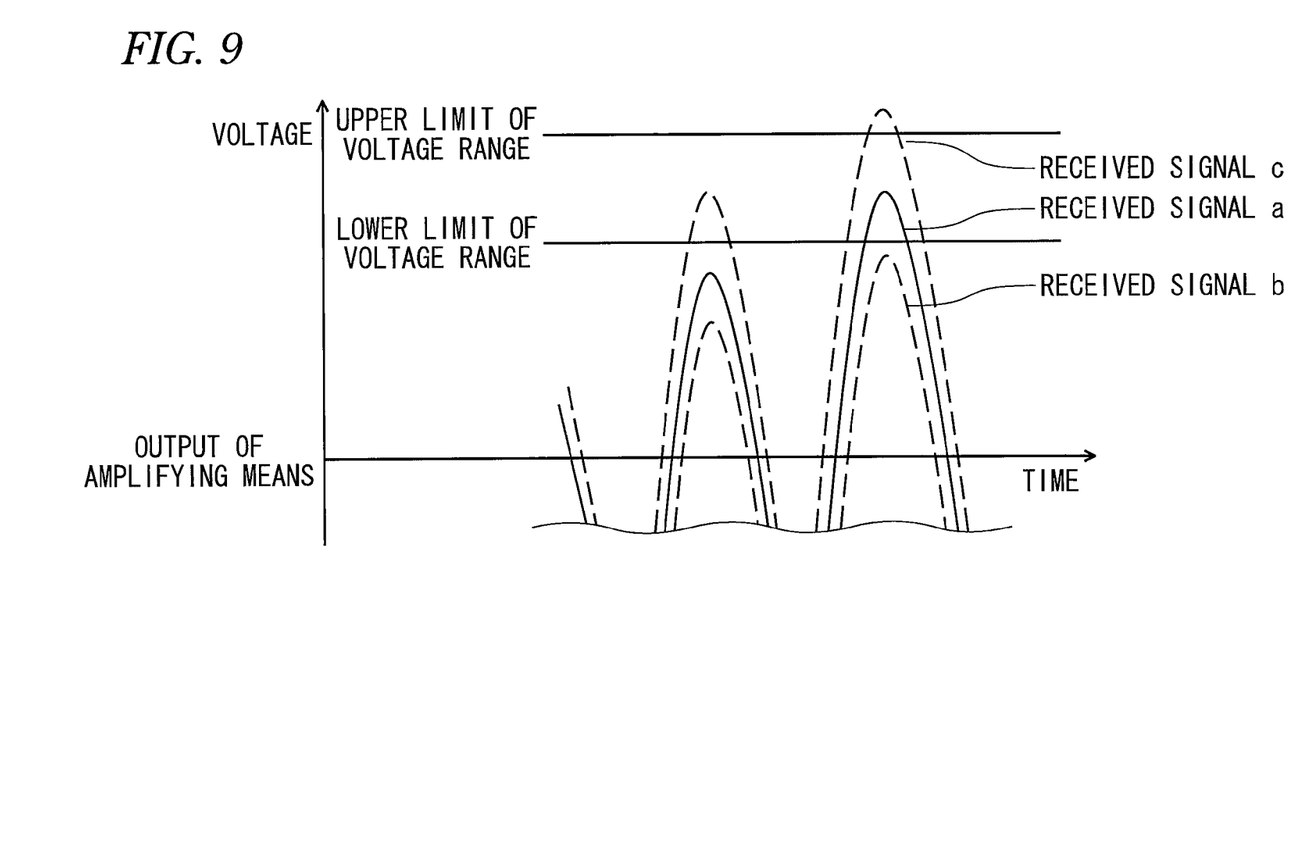
FIG. 9 is a diagram for explaining the operation of the amplifying means of the flow rate measuring device of the related art.

Further, the gain of the amplifying means 26 is adjusted so that the amplitude of the signal received by the ultrasonic transducer on the reception side becomes constant in a manner that the maximum voltage of the received signal is rendered within a predetermined voltage range. In this adjustment, during the measurements repeatedly performed for the number of times set by the repetition means 29, the number of times that the maximum voltage of the received signal becomes lower than the lower limit of the predetermined voltage range like a received signal b shown by a dotted line in FIG. 9 is counted, and also the number of times that the maximum voltage becomes higher than the upper limit of the predetermined voltage range like a received signal c shown by a dotted line in FIG. 9 is counted. Then, the gain at the time of the next flow-rate measurement is adjusted in accordance with the magnitude relationship between these counted numbers. For example, when the number of times that the maximum voltage becomes lower than the lower limit is larger, the gain is increased to thereby set the maximum voltage so as to be between the upper limit and the lower limit of the voltage range like a received signal a shown by a steady line in FIG. 9.

The reference voltage of the reference comparison means 27 to be compared with the received signal amplified by the amplifying means 26 is used to determine the position of a zero cross point detected by the determination means 28. As shown in FIG. 8 as an example, the reference voltage is set to the center point between the peak voltage of the third waveform and the peak voltage of the fourth waveform of the received signal so that the determination means 28 detects a zero cross point a of the fourth waveform of the received signal. Thus, even when the peak voltage of the third waveform of the received signal increases or the peak voltage of the fourth waveform reduces due to some reason, since the reference voltage has some margin with respect to each of these peak voltages, the determination means 28 can stably detect the zero cross point a of the fourth waveform.

CITATION LIST

Patent Literature

PTL 1: JP-A-2003-106882

SUMMARY OF INVENTION

Technical Problem

In the aforesaid flow rate measuring device of the related art, in order to stably detect the zero cross point, the reference voltage is set to the center point between the peak value of the third waveform and the peak value of the fourth waveform of the received signal having the largest voltage difference between the adjacent peak voltages in FIG. 8. However, when a large amount of the fluid flows through the flow path 21 and then the stability of the flow is lost, the propagation path of the ultrasonic changes and so the waveform changes at every measurement, whereby the amplitude of the received signal varies largely. Thus, when the peak value of the third waveform of the received signal increases to a large extent, the zero cross point of the third waveform may be erroneously detected. Further, when the peak value of the fourth waveform of the received signal reduces to a large extent, the zero cross point of the fifth waveform may be erroneously detected. Since the changing amount of the amplitude of the received signal at the time of losing the stability of the flow becomes larger as the increase of the peak voltage, the changing amount of the second waveform becomes larger than that of the first waveform, the changing amount of the third waveform becomes larger than that of the second waveform, and the changing amount of the fourth waveform becomes larger than that of the third waveform. Therefore, according to the flow rate measuring device of the related art which detects the zero cross point of the fourth waveform having the large peak voltage to thereby calculate the flow rate, it is possible to measure the flow rate with high accuracy in a stable state of the flow since the zero cross point of the fourth waveform can be stably detected. However, when a large amount of the fluid flows and then the stability of the flow is lost, the detected point varies at every measurement among the zero cross point of the third waveform and the zero cross point of the fifth waveform. Thus, there arises a problem that the measurement accuracy of the propagation time degrades and the accuracy of the calculated value of the flow rate also degrades.

Solution to Problem

In order to solve the aforementioned problems of the conventional apparatus, a flow rate measuring device of the present invention includes a pair of transducers each of which is provided at a fluid path and transmits and receives an ultrasonic signal; a transmission means which drives the transducers; a switching means which switches transmission/reception between the transducers; an amplifying means which amplifies a received signal from the transducer; a reference comparison means which compares an output from the amplifying means with a reference voltage; a reference voltage setting means which sets the reference voltage to be compared by the reference comparison means; a determination means which determines an arrival timing of the ultrasonic signal based on an output from the reference comparison means and the output from the amplifying means; a clock means which measures a propagation time of the ultrasonic signal from the transducer on a transmission side to the transducer on a reception side; and a calculation means which calculates at least one of a flow speed and a flow rate based on the time calculated by the clock means, wherein the reference setting means changes the reference voltage in accordance with the flow speed or the flow rate calculated by the calculation means.

According to the aforesaid configuration, in the case where it is determined that a large amount of fluid flows such that the stability of the flow is lost, the reference voltage setting means changes the reference voltage so as to be able to detect the zero cross point at the point where the changing amount of the amplitude of the received signal is small. Thus, even when the stability of the fluid flow is lost and the changing amount of the amplitude of the received signal becomes large, since the zero cross point can be detected stably, the flow rate can be measured with high accuracy even in the case of a large amount of fluid flow.

Advantageous Effects of Invention

According to the flow rate measuring device of this invention, even when a large amount of the fluid flows, then the stability of the flow is lost and the changing amount of the amplitude of the received signal becomes large, since the zero cross point can be detected at the portion where the change amount of the amplitude in the received signal is small by changing the reference voltage, the measurement of the flow rate with high accuracy can be realized even at the time of a large amount of fluid flow.

DESCRIPTION OF EMBODIMENTS

The first invention includes a pair of transducers each of which is provided at a fluid path and transmits and receives an ultrasonic signal; a transmission means which drives the transducers; a switching means which switches transmission/reception between the transducers; an amplifying means which amplifies a received signal from the transducer; a reference comparison means which compares an output from the amplifying means with a reference voltage; a reference voltage setting means which sets the reference voltage to be compared by the reference comparison means; a determination means which determines an arrival timing of the ultrasonic signal based on an output from the reference comparison means and the output from the amplifying means; a clock means which measures a propagation time of the ultrasonic signal from the transducer on a transmission side to the transducer on a reception side; and a calculation means which calculates at least one of a flow speed and a flow rate based on the time calculated by the clock means, wherein the reference setting means changes the reference voltage in accordance with the flow speed or the flow rate calculated by the calculation means, so that even when a large amount of the fluid flows, then stability of a flow of the fluid is lost and hence an amplitude of the received signal changes to a large extent, since a zero cross point can be detected at a portion where a change amount of the amplitude in the received signal is small by changing the reference voltage, the measurement of the flow rate with high accuracy can be realized even at a time of a large amount of fluid flow.

The second invention includes a pair of transducers each of which is provided at a fluid path and transmits and receives an ultrasonic signal; a transmission means which drives the transducers; a switching means which switches transmission/reception between the transducers; an amplifying means which amplifies a received signal from the transducer; a reference comparison means which compares an output from the amplifying means with a reference voltage; a reference voltage setting means which sets the reference voltage to be compared by the reference comparison means; a determination means which determines an arrival timing of the ultrasonic signal based on an output from the reference comparison means and the output from the amplifying means; a clock means which measures a propagation time of the ultrasonic signal from the transducer on a transmission side to the transducer on a reception side; and a calculation means which calculates at least one of a flow speed and a flow rate based on the time calculated by the clock means, wherein the reference setting means changes the reference voltage in accordance with a degree of a variance of the flow speed or the flow rate calculated by the calculation means, so that since the reference voltage can be changed in accordance with the variance of the flow speed or the flow rate, the flow rate can be measured stably and the measurement with high accuracy can be realized at a time of losing stability of the flow.

According to the third invention, in the first or second invention, an initial value of the reference voltage is set to a voltage capable of detecting an n-th waveform of the received waveform amplified by the amplifying means, and the reference setting means changes the reference voltage to a voltage capable of detecting a waveform just before the n-th waveform.

Hereinafter, the embodiments of the invention will be explained with reference to drawings. This invention is not limited to these embodiments.

First Embodiment

Figure 1:
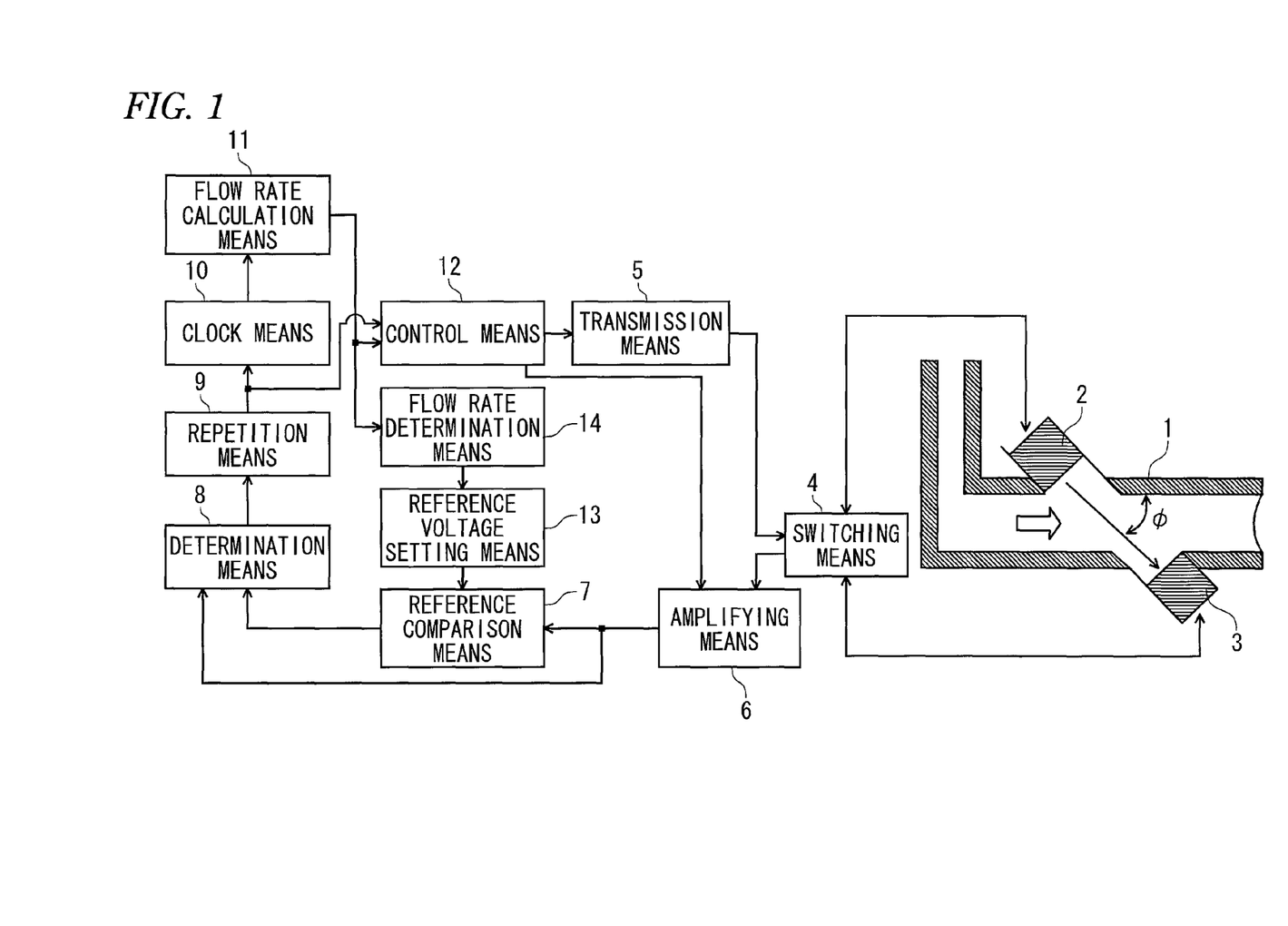
FIG. 1 is a diagram showing the configuration of a flow rate measuring device according to the first embodiment of this invention.
Figure 2:
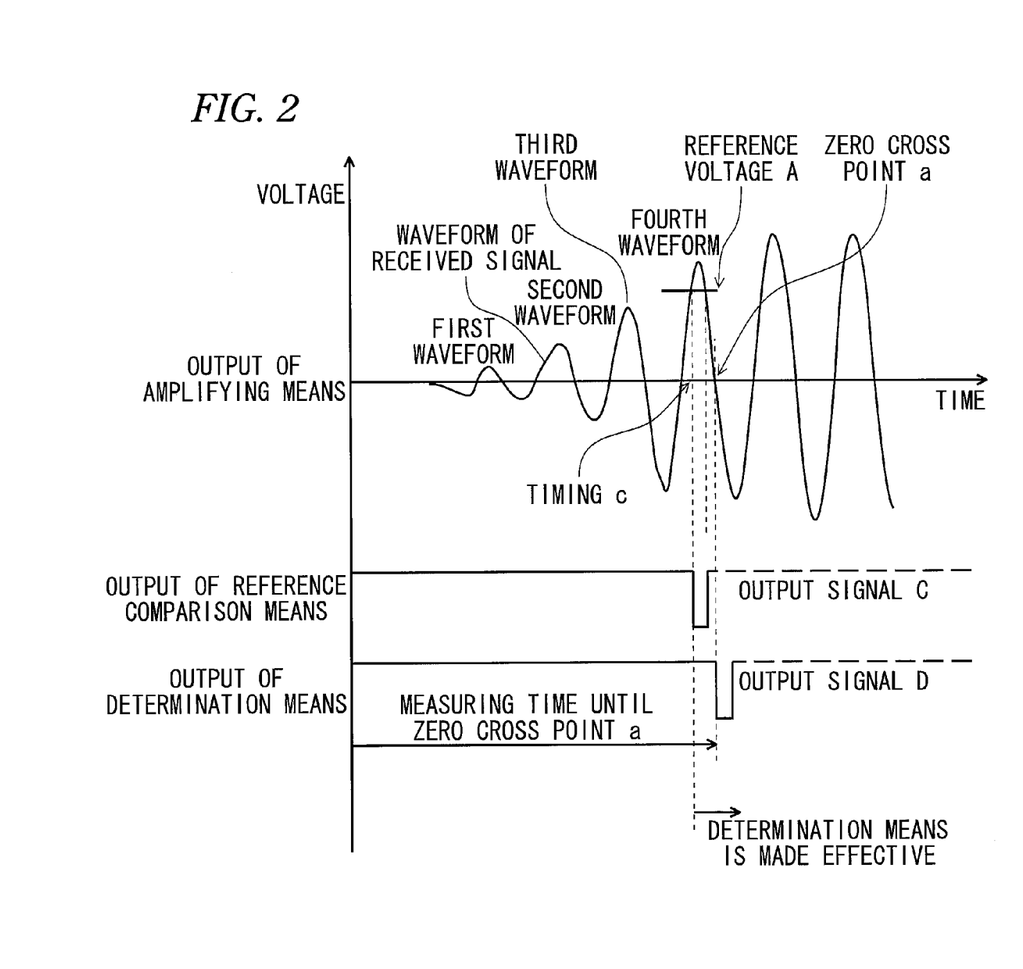
FIG. 2 is a diagram for explaining the operation of the flow rate measuring device according to the first embodiment of this invention.
Figure 3:
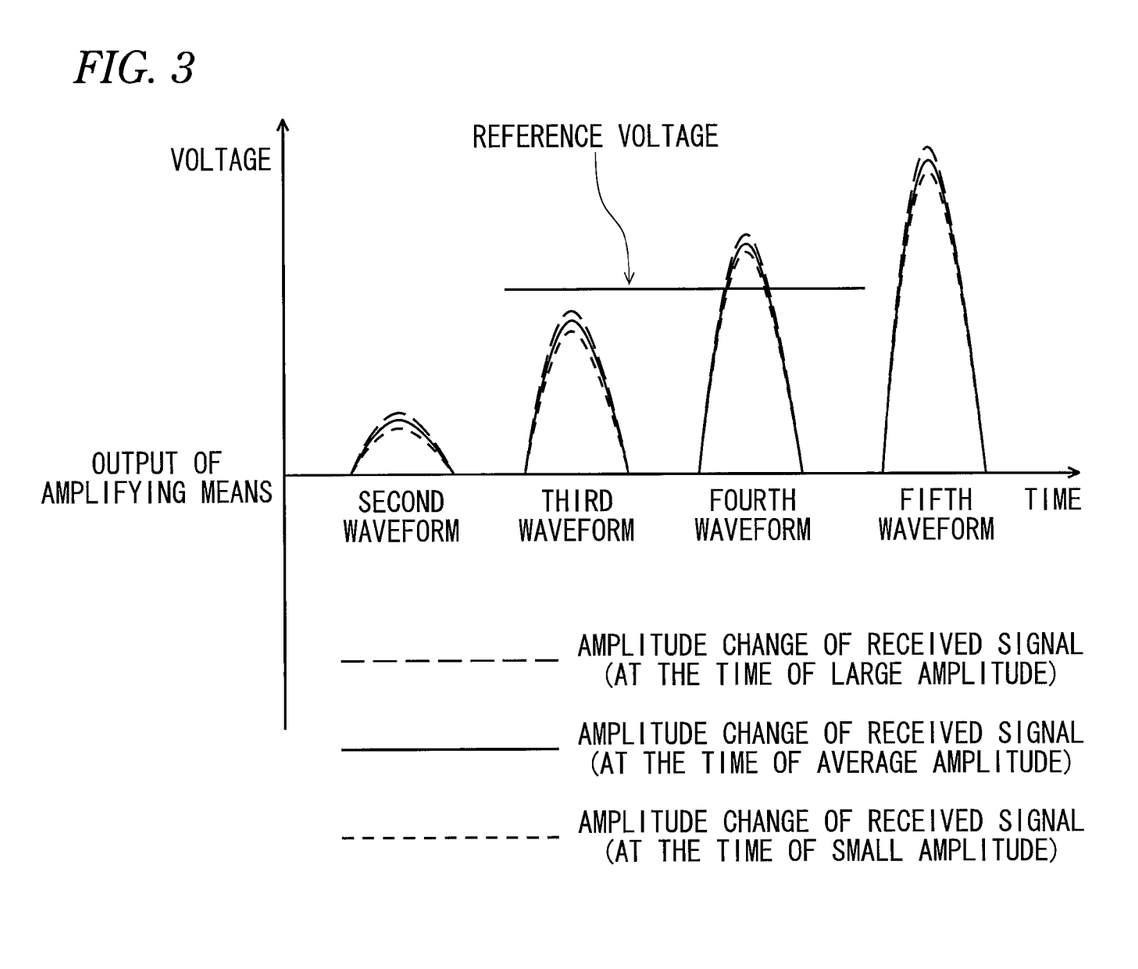
FIG. 3 is a diagram showing the relation between the waveform of a received signal and a reference voltage in the case where the flow is stable in the first embodiment of this invention.
Figure 4:
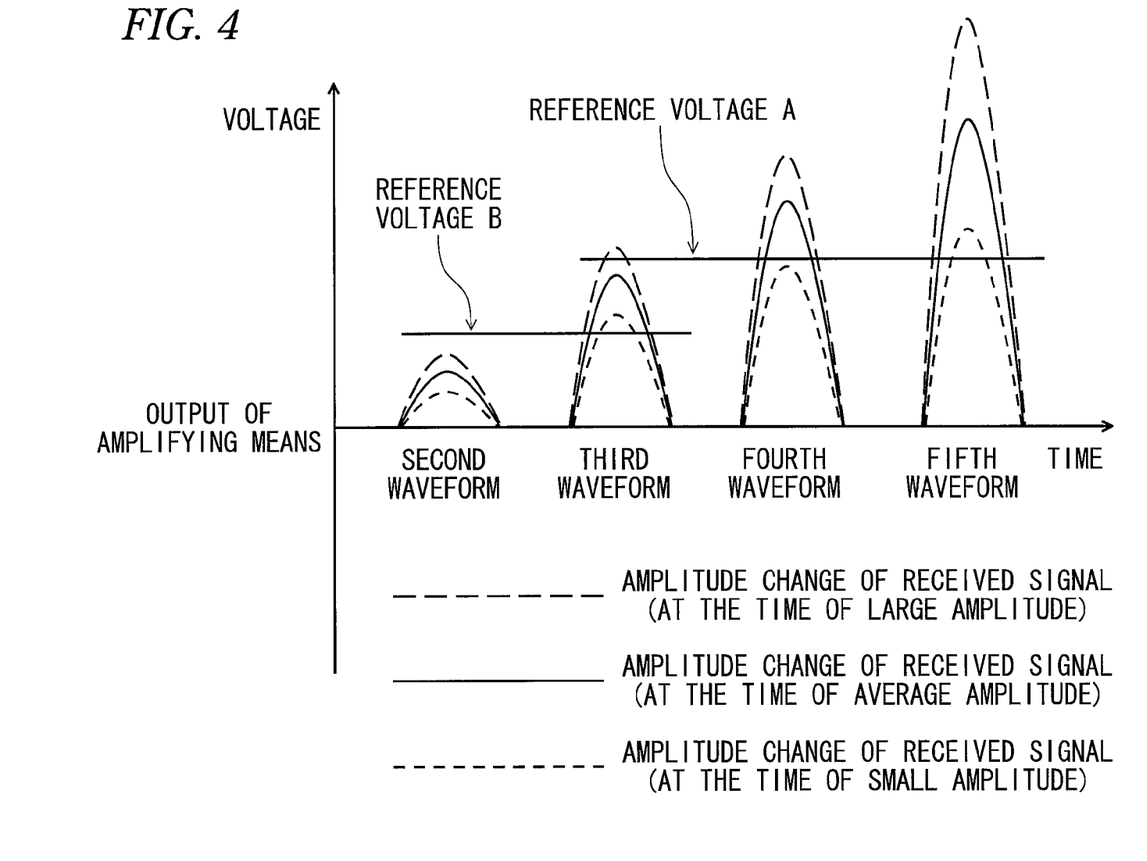
FIG. 4 is a diagram showing the relation between the waveform of the received signal and the reference voltage in the case where the flow is disturbed in the first embodiment of this invention.
Figure 5:
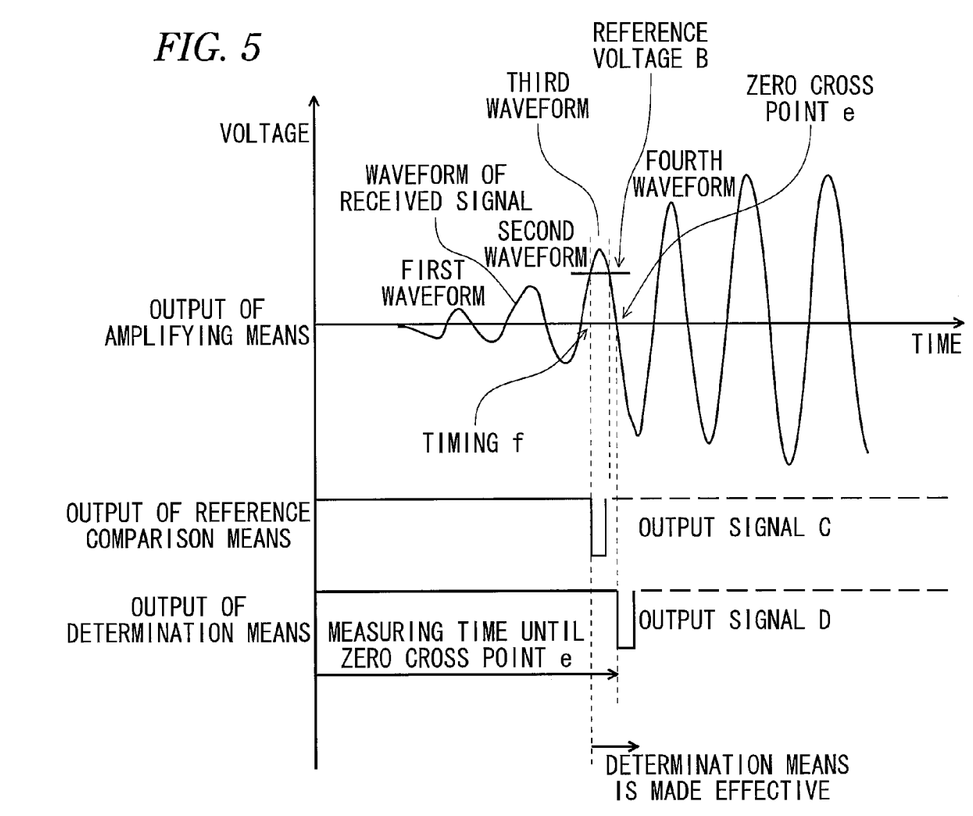
FIG. 5 is a diagram for explaining the operation in the case where the reference voltage is changed in the first embodiment of this invention.

FIG. 1 is a diagram showing the configuration of the flow rate measuring device according to the first embodiment of this invention, FIG. 2 is a diagram for explaining the operation of the flow rate measuring device according to the first embodiment of this invention, FIG. 3 is a diagram for explaining the waveform of a received signal and the reference voltage in the case where the flow within a flow path is stable, FIG. 4 is a diagram for explaining the waveform of the received signal and the reference voltage in the case where the flow within the flow path is disturbed, and FIG. 5 is a diagram for explaining the operation in the case where the reference voltage is changed to a center point between the peak value of the second waveform and the peak value of the third waveform. In each of FIGS. 3 and 4, the waveform on the negative side of the received signal is omitted.

In FIG. 1, the flow rate measuring device includes a first ultrasonic transducer 2 (transducer) for transmitting or receiving the ultrasonic and a second ultrasonic transducer 3 (transducer) for transmitting or receiving the ultrasonic, each disposed on the way of a flow path 1. The flow rate measuring device further includes a switching means 4, a transmission means 5, an amplifying means 6 and a reference comparison means 7. The transmission means 5 drives the first ultrasonic transducer 2 or the second ultrasonic transducer 3. The switching means 4 switches transmission/reception between the first ultrasonic transducer 2 and the second ultrasonic transducer 3. The amplifying means 6 amplifies a signal received by the ultrasonic transducer on a reception side with a gain according to an instruction from a control means 12. The reference comparison means 7 compares the signal (received signal) amplified by the amplifying means 6 with the reference voltage and outputs a signal.

The flow rate measuring device furthermore includes a determination means 8, a repetition means 9, a clock means 10 and a flow rate calculation means (calculation means) 11. The determination means 8 determines an arrival timing of the ultrasonic based on the output of the reference comparison means 7 and the signal amplified by the amplifying means 6. The repetition means 9 counts a signal from the determination means 8 and outputs a repetition signal to the control means 12 for a preset number of times. The clock means 10 accumulates a propagation time in the case of transmitting from the first ultrasonic transducer 2 and also a propagation time in the case of transmitting from the second ultrasonic transducer 3, each for the preset number of times set by the repetition means 9. The flow rate calculation means 11 detects the flow speed of the fluid in accordance with the time measured by the clock means 10 and then calculates a flow rate in view of the size of the flow path and the flow state.

The flow rate measuring device furthermore includes the control means 12, a reference voltage setting means 13 and a flow rate determination means 14. The control means 12 controls the operation of each of the transmission means 5 and the amplifying means 6 in response to a signal from the flow rate calculation means 11 and the signal from the repetition means 9. The reference voltage setting means 13 sets the reference voltage for the reference comparison means 7. The flow rate determination means 14 compares the flow rate calculated by the flow rate calculation means 11 with a preset reference flow rate and outputs a signal to the reference voltage setting means 13.

The operation and action of the flow rate measuring device configured in this manner will be explained.

First, the control means 12 adjusts the gain of the amplifying means 6 to thereby set the amplitude of the received signal to a constant value. Since the gain adjustment method in this case is same as that of the related art, the explanation thereof will be omitted. The control means 12 sets the repetition number of times (64 times, for example) to the repetition means 9 and starts the measurement of the flow rate. When the measurement of the flow rate is started, the control means 12 operates the transmission means 5 to thereby transmit the ultrasonic signal from the first ultrasonic transducer 2. From this time point, the clock means 10 starts the time measurement. The ultrasonic signal received by the second ultrasonic transducer 3 is amplified by the amplifying means 6 and outputted to the reference comparison means 7 and the determination means 8. The reference comparison means 7 compares the received signal with the reference voltage (a center point between the peak value of the third waveform and the peak value of the fourth waveform is set as the reference voltage in FIG. 2) and outputs the signal to the determination means 8. The determination means 8 is made effective from a time point (timing c in FIG. 2) where the output signal C is outputted from the reference comparison means 7. The clock means 10 measures a time from the time point where the determination means 8 is made effective until a time point where the first negative zero-cross point (zero cross point a in FIG. 2), at which the polarity of the output of the amplifying means 6 changes to the negative from the positive, is detected, that is, until the determination means 8 outputs an output signal D.

Then, after the detection of the zero-cross point (zero cross point a in FIG. 2) by the determination means 8, the switching means 4 switches the transmission/reception between the first ultrasonic transducer 2 and the second ultrasonic transducer 3, and the time measurement in the case of transmitting the ultrasonic signal from the second ultrasonic transducer 3 and receiving it by the first ultrasonic transducer 2 is performed in the similar manner. A series of these operations are repeated for the preset number of times, that is, 64 times. Each of the measurement time at the time of transmitting the ultrasonic signal from the first ultrasonic transducer 2 and the measurement time at the time of transmitting the ultrasonic signal from the second ultrasonic transducer 3 is accumulated for the preset number of times, that is, 64 times. After the completion of the operations repeated for the preset number of times, the flow rate calculation means 11 calculates the propagation time in the case of transmitting from the first ultrasonic transducer and the propagation time in the case of transmitting from the second ultrasonic transducer based on the accumulation time at the time of transmitting from the first ultrasonic transducer 2 and the accumulation time at the time of transmitting from the second ultrasonic transducer 3, respectively, then calculates the flow speed and calculates the flow rate. The flow rate determination means 14 compares the flow rate thus calculated with the reference flow rate set in advance and outputs the signal to the reference voltage setting means 13 in accordance with the comparison result.

Explanation will be made with reference to FIG. 3 as to the waveform of the received signal and the reference voltage set by the reference voltage setting means 13 in the case where the flow within the flow path 1 is stable, that is, the flow rate calculated by the flow rate determination means 14 is smaller than the reference flow rate.

A reference voltage A at the initial time is set to the center point between the peak value of the third waveform and the peak value of the fourth waveform. This is because, in the waveform of the received signal, when the comparison is made among the voltage differences between the peak value of the first waveform and the peak value of the second waveform, between the peak value of the second waveform and the peak value of the third waveform, between the peak value of the third waveform and the peak value of the fourth waveform, and between the peak value of the fourth waveform and the peak value of the fifth waveform, the voltage difference between the peak value of the third waveform and the peak value of the fourth waveform is largest. Thus, even when the peak voltage of the third waveform of the received signal increases or the peak voltage of the fourth waveform reduces due to some reason, since the reference voltage has some margin with respect to each of these peak voltages, the determination means 8 can stably detect the zero cross point of the fourth waveform.

In this respect, when the flow within the flow path 1 is stable, since the changing amount of the amplitude of the received signal is small, the changing amount from the average amplitude is small as shown in FIG. 3 in the case where the received signal becomes small (at the time of small amplitude) and also in the case where the received signal becomes large (at the time of large amplitude). Thus, the zero cross point of the fourth waveform can be detected stably by the initial reference voltage A. That is, the zero cross point of the fourth waveform can be detected stably even in the case where the peak value of the third waveform becomes large or the peak value of the fourth waveform becomes small due to the change of the amplitude. Therefore, the flow rate can be measured with high accuracy.

Next, the explanation will be made with reference to FIG. 4 as to the waveform of the received signal and the reference voltage set by the reference voltage setting means 13 in the case where the flow within the flow path 1 is disturbed, that is, the flow rate calculated by the flow rate determination means 14 is larger than the reference flow rate.

The initial reference voltage A is also set to the center point between the third waveform and the fourth waveform. When the stability of the flow within the flow path 1 is lost, the changing amount of the amplitude of the received signal becomes large. Thus, when the peak value of the third waveform becomes large (at the time of large amplitude), the zero cross point of the third waveform is detected despite that the zero cross point of the fourth waveform must be detected originally. In contrast, when the peak value of the fourth waveform becomes small (at the time of small amplitude), the zero cross point of the fifth waveform is detected. In this manner, although it is desired to stably detect the same zero cross point, the detected zero cross point varies at every measurement, that is, among the zero cross points of the third waveform, the fourth waveform and the fifth waveform, due to the change of the amplitude of the received signal. As a result, since the calculated flow rate also varies, the flow rate can not be measured with high accuracy.

However, even in the case where the stability of the flow within the flow path 1 is lost, when the reference voltage is changed into a reference voltage B set to the center point between the peak value of the second waveform and the peak value of the third waveform, the zero cross point of the third waveform can be detected stably even when the peak value of the second waveform becomes large or the peak value of the third waveform becomes small. This is because since the changing amount of the received signal becomes large according to the magnitude of the peak voltage, the changing amount of the second waveform is larger than that of the first waveform, the changing amount of the third waveform is larger than that of the second waveform, and the changing amount of the fourth waveform is larger than that of the third waveform. This is clarified by the experiment. Thus, since the changing amount of the received signal is smaller in the third waveform than the fourth waveform, the zero cross point of the third waveform can be detected stably than the zero cross point of the fourth waveform in a condition that the changing amount of the amplitude of the received signal is large. In other words, the flow rate can be detected with higher accuracy by detecting the zero cross point of the third waveform in the state where a large amount of the fluid flows and the stability of the flow is lost.

Next, the explanation will be made with reference to FIG. 5 as to the operation for detecting the zero cross of the third waveform. The reference comparison means 7 compares the received signal with the reference voltage B set to the center point between the peak value of the second waveform and the peak value of the third waveform to thereby make the determination means 8 effective from a time point where the magnitude relation therebetween is reversed (timing f in FIG. 5), that is, a time point where the output signal C is outputted. The clock means 10 measures a time from the time point where the determination means 8 is made effective until a time point where the first negative zero-cross point (zero cross point e in FIG. 5), at which the polarity of the output of the amplifying means 6 changes to the negative from the positive, is detected, that is, until the output signal D is outputted.

Then, after the detection of the zero-cross point (zero cross point e in FIG. 5) by the determination means 8, the switching means 4 switches the transmission/reception between the first ultrasonic transducer 2 and the second ultrasonic transducer 3, and the time measurement in the case of transmitting the ultrasonic signal from the second ultrasonic transducer 3 and receiving it by the first ultrasonic transducer 2 is performed in the similar manner. A series of these operations are repeated for the preset number of times, that is, 64 times. Each of the measurement time at the time of transmitting the ultrasonic signal from the second ultrasonic transducer 3 and the measurement time at the time of transmitting the ultrasonic signal from the first ultrasonic transducer 2 is accumulated for the preset number of times, that is, 64 times. After the completion of the operations repeated for the preset number of times, the flow rate calculation means 11 calculates the propagation time in the case of transmitting from the first ultrasonic transducer and the propagation time in the case of transmitting from the second ultrasonic transducer based on the accumulation time at the time of transmitting from the first ultrasonic transducer 2 and the accumulation time at the time of transmitting from the second ultrasonic transducer 3, respectively, then calculates the flow speed and calculates the flow rate.

In this manner, when the calculated flow rate is larger than the reference flow rate, the reference voltage setting means 13 changes the reference voltage to be outputted to the reference comparison means 7 from the voltage at the center point between the peak value of the third waveform and the peak value of the fourth waveform to the voltage (reference voltage B) at the center point between the peak value of the second waveform and the peak value of the third waveform. Thus, even when a large amount of the fluid flows, then the stability of the flow is lost and hence the amplitude of the received signal changes to a large extent, since the zero cross point of the third waveform can be detected stably, a large amount of the fluid flow can be measure with high accuracy.

As described above, according to this embodiment, since the flow rate determination means 14 compares the flow rate calculated by the flow rate calculation means 11 with the reference flow rate set in advance. Then, when it is determined that the calculated flow rate is larger than the reference flow rate, the reference voltage setting means 13 changes the reference voltage set thereby to the preset voltage (reference voltage B) at the center point between the peak value of the second waveform and the peak value of the third waveform. Thus, even when a large amount of the fluid flows and the received signal changes to a large extent, since the zero cross point can be detected by changing to the portion having a smaller degree of influence of the change, a large amount of the flow rate can be measured with high accuracy.

Although this embodiment is configured that the reference voltage is changed in accordance with the flow rate calculated by the calculation means, that is, the magnitude relation obtained from the comparison between the flow rate and the reference flow rate, it is of course possible to realize the similar configuration according to the flow speed.

Second Embodiment

Figure 6:
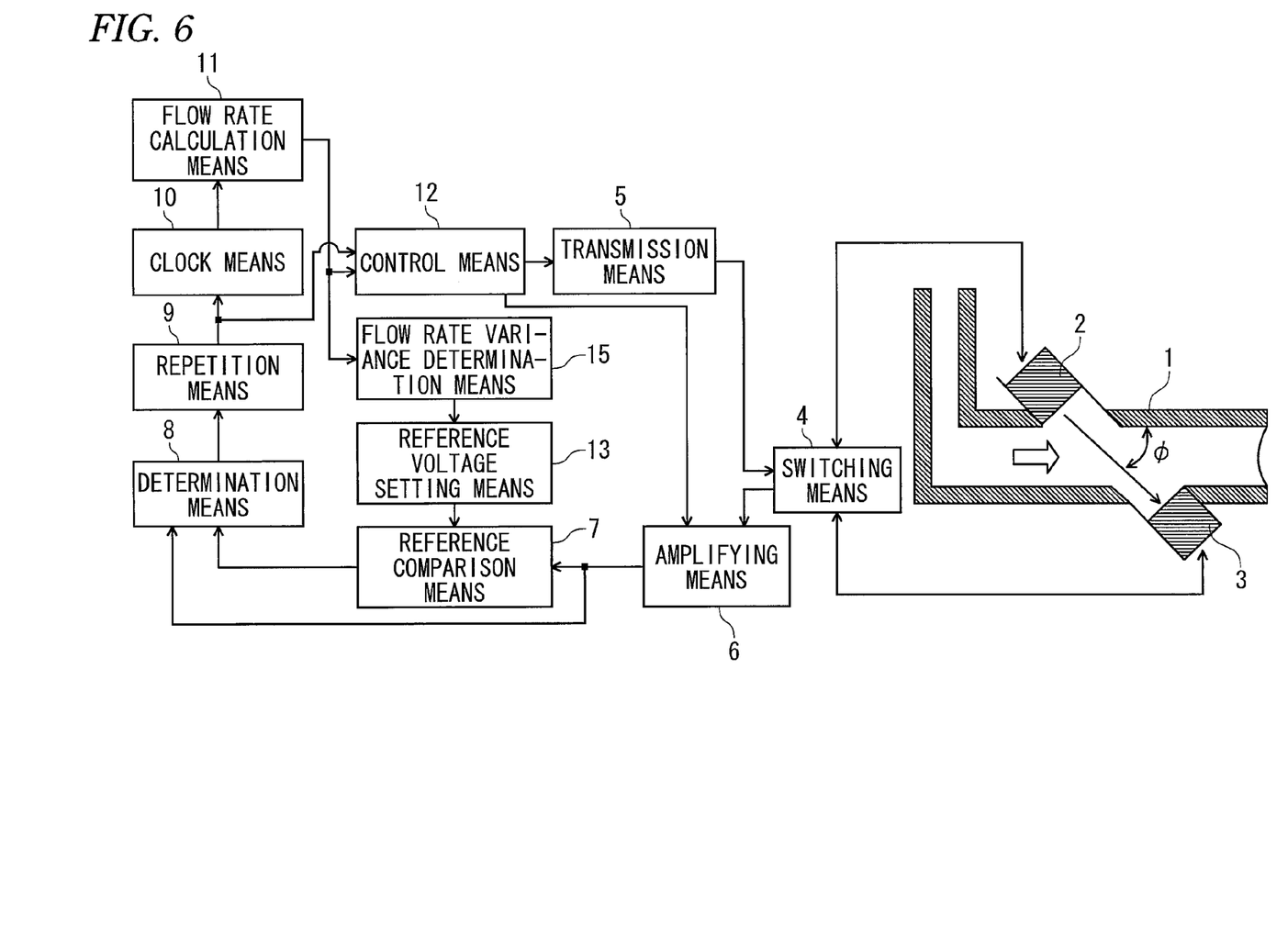
FIG. 6 is a diagram showing the configuration of the flow rate measuring device according to the second embodiment of this invention.

FIG. 6 is a diagram showing the configuration of the flow rate measuring device according to the second embodiment of this invention.

In FIG. 6, this embodiment differs from the first embodiment in a point that the flow rate determination means 14 is replaced by a flow rate variance determination means 15 which compares the variance of the calculated flow rates with a reference variance set in advance and outputs the result of the comparison to the reference voltage setting means 13.

In the second embodiment, the flow rate variance determination means 15 compares the variance of the flow rates calculated by the flow rate calculation means 11 with the reference variance set in advance. Then, when it is determined that the variance of the calculated flow rates is larger than the reference variance, the reference voltage setting means 13 changes the reference voltage to be set to the voltage at the center point between the peak voltage of the second waveform and the peak voltage of the third waveform from the voltage at the center point between the peak voltage of the third waveform and the peak voltage of the fourth waveform. Thus, even in the case where the stability of the flow within the flow path 1 is lost, then the amplitude of the received signal changes and hence the variance of the calculated flow rates becomes large, since the zero cross point can be detected stably at the portion where the degree of the influence of the change in the amplitude of the received signal is small, the flow rate can be measured with high accuracy.

As described above, according to this embodiment, since the reference voltage is changed in the case where the variance of the calculated flow rates is larger than the reference variance, like the first embodiment, the flow rate can be measured with high accuracy even in the case where the stability of the flow within the flow path is lost and then the amplitude of the received signal changes to a large extent. Further, since the stability of the flow within the flow path is determined not based on the absolute values of the calculated flow rates but based on the variance thereof, this embodiment can cope with various types of fluid paths.

Although this embodiment is configured to change the reference voltage in accordance with the flow rate calculated by the calculation means, that is, the magnitude relation obtained from the comparison between the flow rate and the reference flow rate, it is of course possible to realize the similar configuration according to the flow speed.

This invention is intended to contain, as a range to be protected, various changes and applications performed by those skilled in the art based on the description of the specification and well known techniques without departing from the gist and range of this invention. Further, the constituent elements of the aforesaid embodiments may be arbitrarily combined within a range not departing from this invention.

This invention is based on Japanese Patent Application (Japanese Patent Application No. 2009-284700) filed on Dec. 16, 2009, the content of which is incorporated herein by reference.

INDUSTRIAL APPLICABILITY

As described above, since the flow rate measuring device according to this invention changes the reference voltage in accordance with the calculated flow rate or the variance thereof so that the zero cross point can be detected at the portion where the degree of the influence of the change in the received signal is small, the flow rate can be measured with high accuracy even in the case where the flow within the flow path is disturbed and hence the amplitude of the received signal changes to a large extent. Thus, since it becomes possible to realize the flow rate measuring device with quite high accuracy, this invention can be applied to a flow rate measurement verification standard, a gas meter or a water meter etc.

The invention claimed is:
1. A flow rate measuring device, comprising:
 a pair of transducers each of which is provided at a fluid path and transmits and receives an ultrasonic signal;

a transmission means which drives the transducers;
a switching means which switches transmission/reception between the transducers;
an amplifying means which amplifies a received signal from the transducer;
a reference comparison means which compares an output from the amplifying means with a reference voltage;
a reference voltage setting means which sets the reference voltage to be compared by the reference comparison means;
a determination means which determines an arrival timing of the ultrasonic signal based on an output from the reference comparison means and the output from the amplifying means;
a clock means which measures a propagation time of the ultrasonic signal from the transducer on a transmission side to the transducer on a reception side; and
a calculation means which calculates at least one of a flow speed and a flow rate based on the time calculated by the clock means, wherein
the reference setting means changes the reference voltage in accordance with the flow speed or the flow rate calculated by the calculation means.

2. A flow rate measuring device, comprising:
a pair of transducers each of which is provided at a fluid path and transmits and receives an ultrasonic signal;
a transmission means which drives the transducers;
a switching means which switches transmission/reception between the transducers;
an amplifying means which amplifies a received signal from the transducer;
a reference comparison means which compares an output from the amplifying means with a reference voltage;
a reference voltage setting means which sets the reference voltage to be compared by the reference comparison means;
a determination means which determines an arrival timing of the ultrasonic signal based on an output from the reference comparison means and the output from the amplifying means;
a clock means which measures a propagation time of the ultrasonic signal from the transducer on a transmission side to the transducer on a reception side; and
a calculation means which calculates at least one of a flow speed and a flow rate based on the time calculated by the clock means, wherein
the reference setting means changes the reference voltage in accordance with a degree of a variance of the flow speed or the flow rate calculated by the calculation means.

3. The flow rate measuring device according to claim 1, wherein
an initial value of the reference voltage is set to a voltage capable of detecting an n-th waveform of the received waveform amplified by the amplifying means, and
the reference setting means changes the reference voltage to a voltage capable of detecting a waveform just before the n-th waveform.

4. The flow rate measuring device according to claim 2, wherein
an initial value of the reference voltage is set to a voltage capable of detecting an n-th waveform of the received waveform amplified by the amplifying means, and
the reference setting means changes the reference voltage to a voltage capable of detecting a waveform just before the n-th waveform.

\* \* \* \* \*